United States Patent
Boutnaru (10) Patent No.: US 10,223,536 B2
(45) Date of Patent: Mar. 5, 2019

(54) DEVICE MONITORING POLICY (71) Applicant: PayPal, Inc., San Jose, CA (US)

(72) Inventor: Shlomi Boutnaru, Modi'in-Maccabim-Re'ut (IL)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/394,555

(22) Filed: Dec. 29, 2016

(65) Prior Publication Data

US 2018/0189498 A1    Jul. 5, 2018

(51) Int. Cl.
  *G06F 21/57*    (2013.01)
  *G06F 21/52*    (2013.01)
  *G06F 21/55*    (2013.01)
  *H04L 29/06*    (2006.01)
  *G06F 9/50*     (2006.01)

(52) U.S. Cl.
  CPC ............ *G06F 21/577* (2013.01); *G06F 21/52* (2013.01); *H04L 63/1433* (2013.01); *G06F 9/50* (2013.01); *G06F 2221/033* (2013.01)

(58) Field of Classification Search
  CPC ........ G06F 21/577; G06F 21/52; G06F 21/50; G06F 21/552; G06F 21/554; G06F 21/566; G06F 9/50; G06F 9/5083; G06F 2221/033; G06F 2221/034; H04L 63/20; H04L 63/1425; H04L 63/1433; H04L 63/1416; H04L 63/1408
  See application file for complete search history.

(56) References Cited

U.S. PATENT DOCUMENTS

| | | | | |
|---|---|---|---|---|
| 7,784,054 B2* | 8/2010 | Monasterio | ........... | G06F 9/4843 709/223 |
| 7,877,482 B1* | 1/2011 | Ashcraft | ............... | G06F 9/5022 709/226 |
| 9,117,077 B2* | 8/2015 | Mircescu | ................ | G06F 21/56 |
| 9,400,682 B2* | 7/2016 | Persikov | ............ | G06F 11/3096 |
| 9,762,610 B1* | 9/2017 | Kwan | ................ | H04L 63/1458 |
| 9,813,447 B2* | 11/2017 | Rash | ........................ | H04L 63/20 |
| 2003/0061261 A1* | 3/2003 | Greene | .................. | G06Q 10/06 718/104 |
| 2003/0196136 A1* | 10/2003 | Haynes | ............... | G06F 11/0715 714/13 |
| 2007/0204257 A1* | 8/2007 | Kinno | ..................... | G06F 11/28 717/100 |
| 2009/0119673 A1* | 5/2009 | Bubba | ....................... | G06F 9/50 718/104 |

(Continued)

*Primary Examiner* — Nelson Giddins
(74) *Attorney, Agent, or Firm* — Maschoff Brennan (57) ABSTRACT

A method and device for generating a monitoring policy for a device and selectively monitoring multiple tasks executed by the device is disclosed. The monitoring policy may relate to security monitoring or resource availability. A monitoring importance score for each of multiple tasks executing on the device may be generated and a monitoring resource availability within the device may be determined. The monitoring policy for the device may be generated based at least in part on the monitoring importance scores for the multiple tasks and the monitoring resource availability within the device. Fewer than all of the multiple tasks may be selectively monitored based on the monitoring policy for security threats to the device or resource availability for the device.

15 Claims, 6 Drawing Sheets

(56) References Cited

U.S. PATENT DOCUMENTS

| | | | |
|---|---|---|---|
| 2009/0241095 A1* | 9/2009 | Jones | G06F 11/3419 717/128 |
| 2010/0125665 A1* | 5/2010 | Simpson | G06F 11/3409 709/224 |
| 2010/0153963 A1* | 6/2010 | Kakarlamudi | G06F 17/30306 718/105 |
| 2010/0162036 A1* | 6/2010 | Linden | G06F 11/181 714/4.11 |
| 2012/0054466 A1* | 3/2012 | Devendran | G06F 12/10 711/207 |
| 2012/0069131 A1* | 3/2012 | Abelow | G06Q 10/067 348/14.01 |
| 2013/0024939 A1* | 1/2013 | Glew | G06F 21/577 726/24 |
| 2013/0166342 A1* | 6/2013 | Fradkin | G06Q 10/06 705/7.15 |
| 2013/0196649 A1* | 8/2013 | Paddon | H04M 1/66 455/423 |
| 2014/0047096 A1* | 2/2014 | Kupershmidt | G06Q 10/0631 709/224 |
| 2014/0068348 A1* | 3/2014 | Mondal | H04L 41/16 714/45 |
| 2014/0068628 A1* | 3/2014 | Kaneko | G06F 9/485 718/105 |
| 2014/0165070 A1* | 6/2014 | Persikov | G06F 9/4881 718/103 |
| 2014/0280889 A1* | 9/2014 | Nispel | H04L 43/04 709/224 |
| 2014/0282586 A1* | 9/2014 | Shear | G06F 9/5072 718/104 |
| 2014/0325650 A1* | 10/2014 | Pavlyushchik | G06F 21/566 726/23 |
| 2015/0096019 A1* | 4/2015 | Davis | H04L 63/1408 726/23 |
| 2015/0106509 A1* | 4/2015 | Lee | H04L 43/0876 709/224 |
| 2015/0121524 A1* | 4/2015 | Fawaz | G06F 21/566 726/23 |
| 2015/0160977 A1* | 6/2015 | Accapadia | G06F 9/5083 718/104 |
| 2015/0278123 A1* | 10/2015 | Nayshtut | G06F 9/48 711/163 |
| 2016/0253497 A1* | 9/2016 | Christodorescu | G06F 21/554 726/23 |
| 2016/0269429 A1* | 9/2016 | Martini | H04L 63/1416 |
| 2016/0323377 A1* | 11/2016 | Einkauf | H04L 67/1076 |
| 2016/0344799 A1* | 11/2016 | Fawcett | H04L 67/10 |
| 2017/0024660 A1* | 1/2017 | Chen | G06N 99/005 |
| 2017/0083703 A1* | 3/2017 | Abbasi | G06F 21/561 |
| 2017/0134405 A1* | 5/2017 | Ahmadzadeh | H04L 63/1416 |
| 2017/0195994 A1* | 7/2017 | Cole | G06Q 40/02 |
| 2017/0255498 A1* | 9/2017 | King-Smith | G06F 9/5083 |
| 2017/0279685 A1* | 9/2017 | Mota | H04L 41/12 |
| 2018/0062990 A1* | 3/2018 | Kumar | H04L 45/70 |

* cited by examiner

DEVICE MONITORING POLICY

TECHNICAL FIELD

This disclosure relates generally to cyber security, and more specifically to generating a monitoring policy for a device.

BACKGROUND

Devices are subject to nefarious or erroneous software processes and threads. In various instances, a computing device may have limited resources to monitor software processes and threads that are possibly malicious.

BRIEF DESCRIPTION OF THE DRAWINGS

Example embodiments will be described and explained with additional specificity and detail through the use of the accompanying drawings in which.

DETAILED DESCRIPTION

Because devices are subject to nefarious or erroneous software including one or more tasks, Applicant recognizes a need to provide a device monitoring policy that enables monitoring of devices for security breaches, resource unavailability, or error detection. As used herein, "task" includes one or more of a "process" or a "thread" as are commonly understood by one of ordinary skill in the art.

According to one or more embodiments of the present disclosure, electronic devices may be monitored to determine anomalous behavior that may be associated with nefarious or erroneous software. In particular, embodiments of the present disclosure describe a method and system for monitoring a device according to a device monitoring policy. The monitoring policy may be configured to prioritize the monitoring of tasks being executed as opposed to monitoring all tasks to help improve monitoring of the device for security breaches, resource unavailability, or error detection while reducing or minimizing the impact of the monitoring on performance of the device. Stated in another manner, it may be infeasible in various instances to monitor all tasks on a machine for possible malfeasance. Instead, limited resources may be used to perform monitoring in an as-needed manner.

Various techniques for generating a device monitoring policy are disclosed. For example, in the various embodiments, a specific score may be calculated for each task executable in the device. The score of each task may be based on a weighting of different attributes (e.g., execution duration, security context, permissions, quantity of input interfaces, quantity of output interfaces). A threshold may be generated based on the amount of device resources (e.g., processor cycles, available memory, network bandwidth) available for monitoring. A monitoring policy may then be generated based at least in part on the resulting score of the task in response to a comparison against the threshold of available resources.

According to at least one embodiment, a method for generating a monitoring policy for a device is disclosed. A monitoring importance score for each of multiple tasks executing on a device may be generated and a monitoring resource availability within the device also may be determined. The monitoring policy for the device may be generated based at least in part on the monitoring importance scores for the multiple tasks and the monitoring resource availability within the device. The monitoring policy may dictate selective monitoring of the multiple tasks executing on the device in response to resources of the device that are available for monitoring but are insufficient to monitor all of the multiple processes executing on the device. Accordingly, the device may selectively monitor fewer than all of the multiple tasks executing on the device according to the monitoring policy.

According to at least another embodiment, a device may include one or more processors and one or more non-transitory computer-readable medium coupled to the one or more processors. The medium may include instructions that, in response to being executed by the one or more processors, are configured to cause the one or more processors to perform operations. The operations may include generating a monitoring importance score for each of multiple tasks executing on a device. The operations may further include determining monitoring resource availability within the device. Further, the operations may include generating a monitoring policy for the device based at least in part on the monitoring importance scores for the multiple tasks and the monitoring resource availability within the device. The monitoring policy may dictate selective monitoring of the multiple tasks executing on the device in response to resources of the device that are available for monitoring but are insufficient to monitor all of the multiple tasks executing on the device. Accordingly, the device may then selectively monitors fewer than all of the multiple tasks executing on the device according to the monitoring policy.

Yet other embodiments of the present disclosure may include computer-readable medium storage storing instructions that in response to being executed by a processor cause the processor to perform instructions in accordance with one or more embodiments described herein.

Other aspects, as well as features and advantages of various aspects, will become apparent to those of skill in the art though consideration of the ensuing description, the accompanying drawings and the appended claims.

Figure 1:
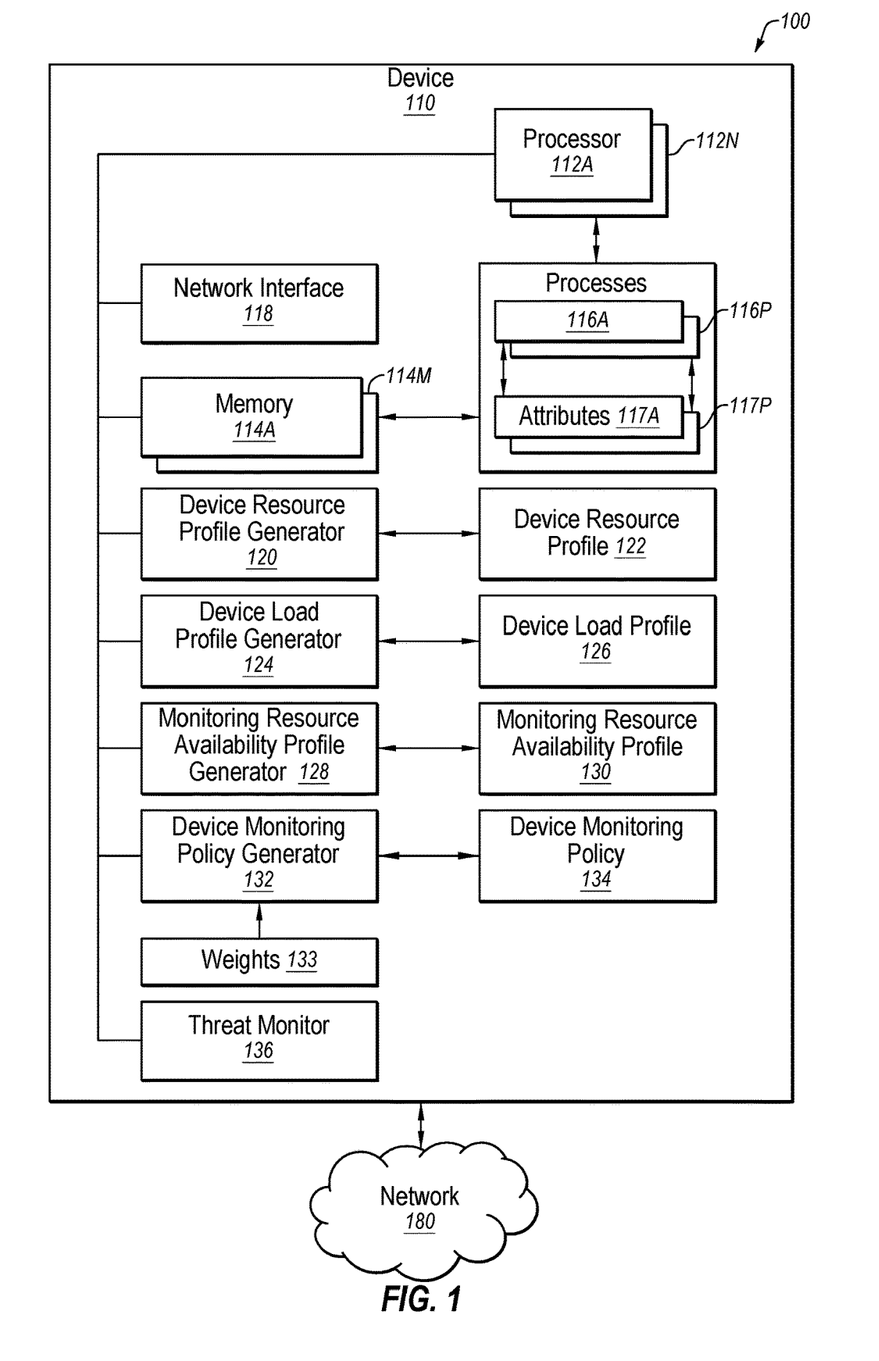
FIG. 1 is a block diagram illustrating a system configured to generate and execute a device security monitoring policy.

FIG. 1 is a block diagram illustrating a system 100 configured to generate a device monitoring policy. System 100 may include one or more devices 110 configured for coupling to a network 180. Network 180 may be any type of network including a Local Area Network (LAN), a Wide Area Network (WAN), Personal Area Network (PAN) or any other type of network that provides an interface to a device 110 through which nefarious or erroneous activity (e.g., malicious code, tasks or control) may find access. System 100 may be a wired, wireless, optical, or any other form of network where a device may be externally accessible through a network interface.

Devices 110 may be varying types of devices such as, but not limited to, a server, computer, tablet, mobile phone, etc. Further, each type of device 110 may include varying amounts of resources, such as computational resources, storage resources and networking resources. The method and system described herein for generating a device monitoring policy may be configured to adapt to the specific resources available to device 110.

Device 110 may include one or more processors (or cores) 112, illustrated as processors 112A-112N. Device 110 further may include one or more memories 114, illustrated as memories 114A-114M. As noted above, device 110 may include a configuration such as a server with multiple resources such as multiple processors 112 and multiple memories 114, or device 110 may include a configuration such as a mobile device with fewer or even singular processors 112 and singular memories 114. While processors 112 and memories 114 are illustrated as being separate entities, integrated processors and memories, commonly referred to as controllers, are also contemplated.

Device 110 may further include a network interface 118 which may provide device 110 with access to one or more networks, such as network 180. Network interface 118 may provide coupling with LANs, WANs, PANs or other network types and may occur using wired, wireless, optical, or other physical communication mediums. Network interface 118, in addition to processors 112 and memories 114, may be considered a resource of device 110.

As stated, the monitoring policy may be adaptable based upon various conditions and capabilities of the specific type and configuration of device 110. Accordingly, in some embodiments device 110 may include a device resource profile generator 120 configured to generate a device resource profile 122. Device resource profile 122 may be a table that may include a quantity of processors, cores or computational capabilities of device. Device resource profile 122 may further include a quantity of memory or storage capabilities of the device. Further, device resource profile 122 may further include networking capabilities of the device such as bandwidth capabilities of any network interface card or bandwidth of a network pipeline coupled to the device.

Figure 2:
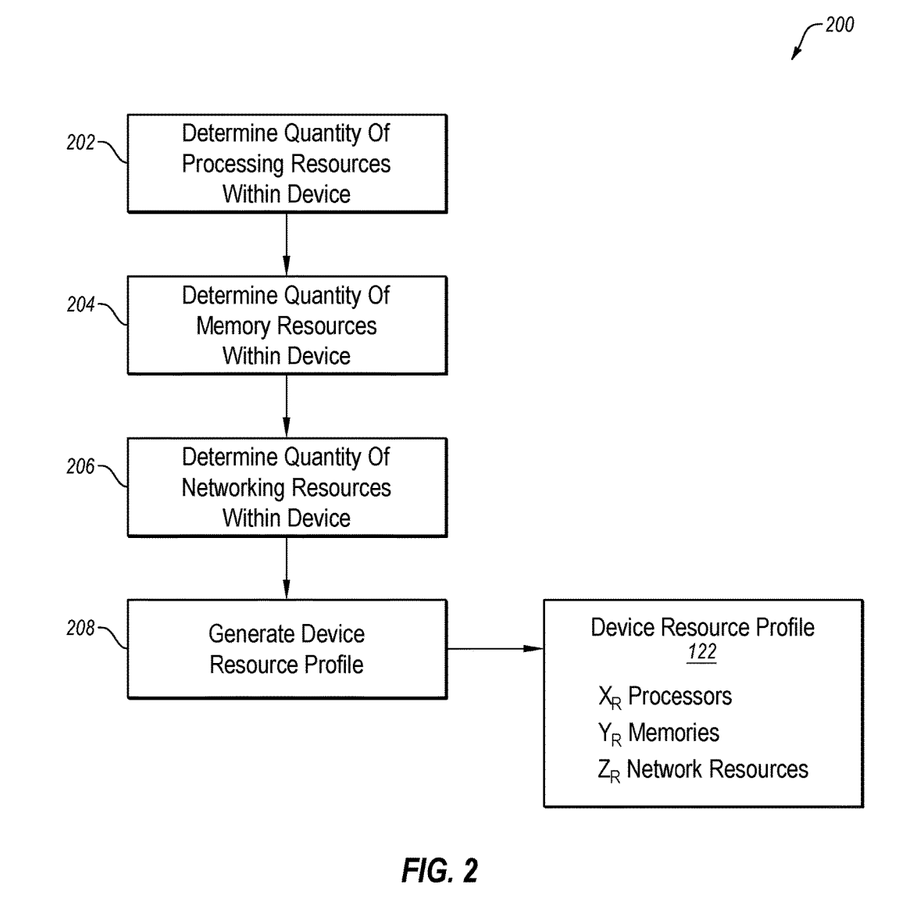
FIG. 2 is a flow diagram illustrating an embodiment for determining a device resource profile.

Device resource profile generator 120 may be configured according to a process 200 described with respect to FIG. 2. As stated, device 110 may be one of differently configured devices such as a device with extensive resources including a plurality of one or more processors 112, memories 114 and network bandwidth via network interface 118.

FIG. 2 is a flow diagram illustrating an embodiment for determining a device resource profile. Although illustrated as discrete blocks, various blocks of process 200 may be divided into additional blocks, combined into fewer blocks, or eliminated, depending on the particular implementation.

In process 200, amounts of processing, memory and networking resources may be determined. By determining these amounts, a general or standardized monitoring process may be employed for varyingly configured devices. For example, a device configured as, for example, a server with multiple processors, substantial amounts of memory and large networking bandwidth, may be capable of performing more extensive monitoring than a device that may be configured, for example, as a portable or embedded electronic device with minimal processing, memory and networking capabilities.

A block 202 may determine an amount of processing resources available within device 110. Processing resources may include, for example, a quantity of processors 112, a quantity of cores (not shown) within a processor 112, a capability of processors 112 such as quantity of execution cycles capable of being performed by processors 112, or other attributes known for quantifying a capability of processor 112. Additionally or alternatively, the capability of processing resources may include resources available inclusive or exclusive of operating system demands. For example, processing resources may be determined as resources available in excess of those required to support the device's basic operation.

A block 204 may determine an amount of memory resources available within device 110. Memory resources may include, for example, a quantity of memories 114, capacity of memories 114, a bandwidth capability of memories 114, or other attributes known for quantifying a capability of memories 114. Additionally or alternatively, the capability of memory resources may be alternatively referred to as resources available inclusive or exclusive of operating system demands. For example, memory resources may be determined as resources available in excess of those required to support the device's basic operation.

A block 206 may determine an amount of networking resources available within device 110. Networking resources may be variously referred to as a bandwidth of network interface 118, a bandwidth of network 180 with which network interface 118 communicates, or other capability or other attributes known for quantifying a capability of network interface 118.

A block 208 may generate device resource profile 122 from the above determining evaluations. Device profile 122 may be configured as a table with values or device resource profile 122 may be a designator for defining specific performance classes of devices (e.g., server-class device, portable computer-class device, handheld-class device, etc.). Device resource profile 122 may be utilized in subsequent processes referred to below for generating the monitoring policy. Device resource profile 122 may list device capabilities a quantity of processors, cores, memory capacity, network bandwidth, etc. or device capabilities may be listed as a functional metric in the form of capable execution cycles or capable processor calculations.

Returning to FIG. 1, device 110, by way of processors 112 executing executable instructions stored in memories 114, may generate tasks 116, illustrated as tasks 116A-116P. Tasks 116 may include security processes or threads, computational processes or threads, network communication processes or threads, or other processes or threads. In response to executing tasks 116, device 110 and more particularly processors 112, memories 114 and network interface 118, may exhibit a specific utilization of resources also known as a "load." The utilization of resources may be analyzed over a period of time (e.g., seconds, minutes, hours, days, weeks, etc.) to determine an average or quiescent load for device 110.

A load may include a resource usage in the absence of any nefarious or erroneous tasks. Accordingly, in some embodiments, device 110 may include a device load profile generator 124 configured to generate a device load profile 126. A device load profile 126 may assist in determining a utilization of the resources of the device. For example, a more heavily loaded device may have fewer resources available for monitoring since the resources are already committed to performing tasks associated with the normal functionality of the device. Device load profile generator 124 may be configured according to a process 300 described with respect to FIG. 3. As stated, device 110 may be one of differently loaded devices such as a device with extensive resource utilization including execution of a plurality of tasks 116.

Figure 3:
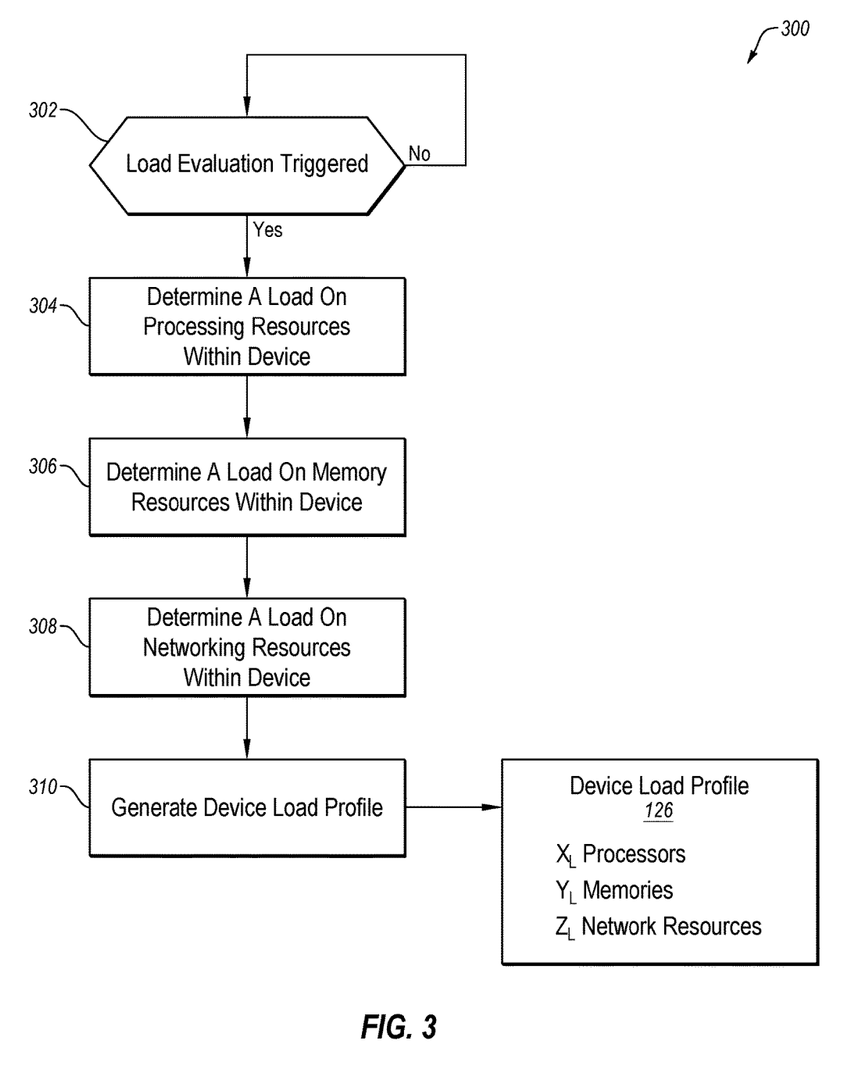
FIG. 3 is a flow diagram illustrating an embodiment for determining a device load profile.

FIG. 3 is a flow diagram illustrating an embodiment for determining a device load profile. Although illustrated as discrete blocks, various blocks of process 300 may be divided into additional blocks, combined into fewer blocks, or eliminated, depending on the particular implementation.

In process 300, amounts of loading of processing, memory and networking resources occurring at the device may be determined. By determining these amounts, a general or standardized monitoring process may be employed for varyingly loaded devices. Since there is no standardized loading for devices, some devices may be operating near the capacity of the resources (e.g., processing, memory and networking resources) of the device which would leave few resources available for performing monitoring. Conversely, some devices may be very lightly loaded which may leave considerable resources available for an increased level of monitoring.

A block 302 may determine if a triggering event such as a timeout or scheduled 'snapshot' period has occurred to perform a load evaluation of device 110. The triggering may be based on a time period (e.g., day month, year, etc.) or may be based on an event such as a detection of a change in load indicating one of security breaches, resource unavailability, or error detection. A change in loading of the device from a lesser to a greater load may signify an increased utilization of resources leading to a reduction in available monitoring bandwidth. Also, a change in loading of the device from a greater to a lesser load may signify a decreased utilization of resources leading to an increase in available monitoring bandwidth. In response to a triggering event not being detected, processing may continue to evaluate for a triggering event.

In response to detection of a triggering event, a block 304 may evaluate an amount of loading of resources within device 110. Processor loading may be variously referred to as a percentage of execution cycles used by processors 112 in executing conventional tasks 116 over a period of time, or other attributes known for quantifying loading of processor 112. The loading or utilization of processing resources may be alternatively referred to as resources utilized inclusive or exclusive of operating system demands. For example, processor loading may be determined as loading in excess of a load required to support the device's basic operation. The loading of processor resources may be an indication of the availability of processor resources for performing additional operations such as monitoring.

A block 306 may evaluate an amount of loading of memory resources within device 110. Loaded memory resources may be variously referred to as a percentage of utilized memory 114, or other attributes known for quantifying a loading of memories 114. The utilization of memory resources may be alternatively referred to as resources utilized inclusive or exclusive of operating system demands. The loading of memory resources may be an indication of the availability of memory resources for performing additional operations such as monitoring.

A block 308 may evaluate an amount of loading of networking resources within device 110. Loaded networking resources may be variously referred to as a percentage of utilized bandwidth of network interface 118, a percentage of utilized bandwidth of network interface 118, or other capability or other attributes known for quantifying a utilization of network interface 118. The loading of networking resources may be an indication of the availability of networking resources for performing additional operations such as monitoring for security breaches, resource unavailability, or error detection.

A block 310 may generate a device load profile 126 from the above determining evaluations. Device load profile 126 may be configured as a table with values or device load profile 126 may be a designator for a relative loading of a device (e.g., highly loaded, moderately loaded, lightly loaded, etc.). Device loading profile 126 may be utilized in subsequent processes referred to below for generating the monitoring policy. Device load profile 126 may list device loading as a utilization of processors, cores, memory capacity, network bandwidth, etc. or device loading may be listed as a functional metric in the form load-utilized execution cycles or load-utilized processor calculations.

Returning to FIG. 1, device 110 may include a monitoring resource availability profile generator 128 configured to generate a monitoring resource availability profile 130. Monitoring resource availability profile generator 128 may be configured according to the process 400 described with respect to FIG. 4.

Figure 4:
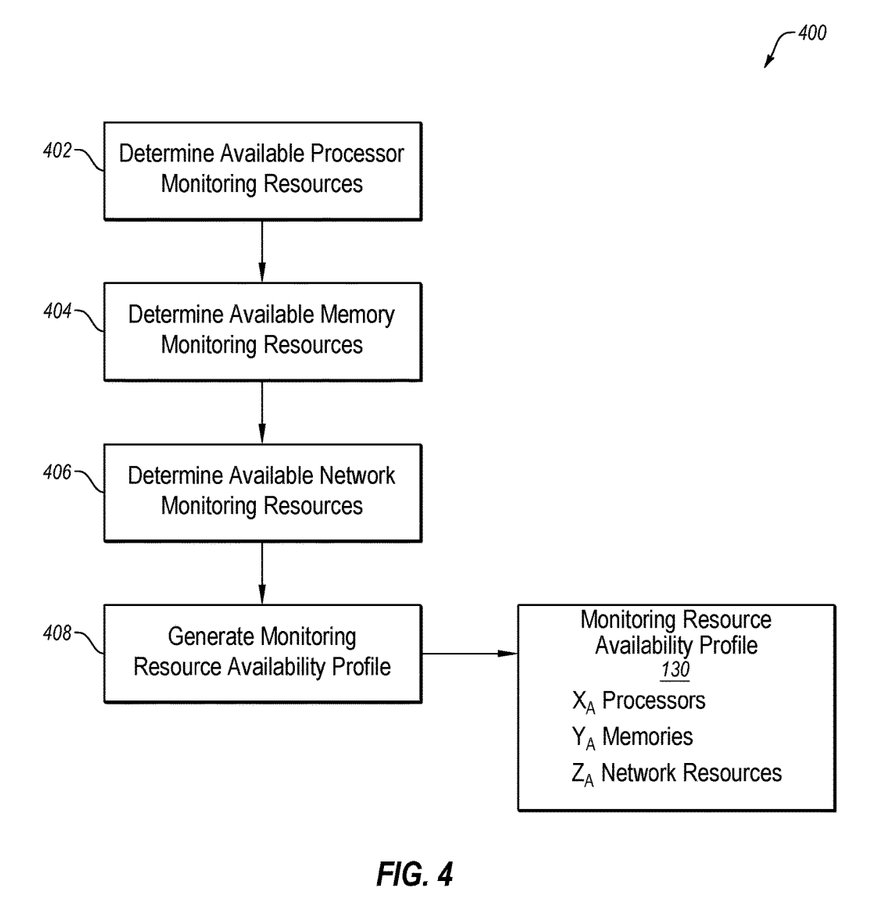
FIG. 4 is a flow diagram illustrating an embodiment for determining a monitoring resource availability profile.

FIG. 4 is a flow diagram illustrating an embodiment for determining a monitoring resource availability profile. Although illustrated as discrete blocks, various blocks of process 400 may be divided into additional blocks, combined into fewer blocks, or eliminated, depending on the particular implementation.

In process 400, amounts of available processing, memory and networking resources may be determined. By determining available amounts, a general or standardized monitoring process may be employed for varyingly configured and varying loaded devices. For example, a device may be configured with abundant resources but may be heavily loaded which may result in a small amount of available resources for monitoring of tasks in the device. Alternatively, a device may be configured with abundant resources and may be lightly loaded which may allow for more extensive monitoring of tasks in the device. Further, a device may be configured with sparse resources but may be heavily loaded which may result in a small amount or no resources being available for monitoring of tasks in the device. Alternatively, a device may be configured with sparse resources and may be lightly loaded which may allow for more extensive monitoring of tasks in the device.

A block 402 may determine an amount of available processor monitoring resources available within device 110. Available processor monitoring resources may be a difference between an amount of processors in the device resource profile 122 and the amount of processors or processing expended in the device load profile 126. As stated, the available processor monitoring resources in the monitoring resource availability profile 130 may be a quantity of processors 112, a quantity of cores (not shown) within a processor 112, a capability of processors 112 such as quantity of execution cycles that are unutilized during execution of the operational load as identified above with respect to process 300.

A block 404 may evaluate an amount of available memory monitoring resources available within device 110. Available memory monitoring resources may be a difference between an amount of memory in the device resource profile 122 and the amount of memory expended in the device load profile 126. As stated, the available memory monitoring resources in the monitoring resource availability profile 130 may be a quantity of memories 114, capacity of memories 114, a bandwidth capability of memories 114 that may be unutilized during execution of the operational load as identified above with respect to process 300.

A block 406 may evaluate an amount of available network monitoring resources available within device 110. Available network monitoring resources may be a difference between an amount of networking resources in the device resource profile 122 and the amount of networking resources expended in the device load profile 126. As stated, the available network monitoring resources in the monitoring resource availability profile 130 may be a bandwidth of network interface 118, a bandwidth of network 180 with which network interface 118 communicates, that may be unutilized during execution of the operational load as identified above with respect to process 300.

A block 408 may generate a monitoring resource availability profile 130 from the above determining evaluations. Monitoring resource availability profile 130 may be configured as a table with values or monitoring resource availability profile 130 may be a designator for defining specific classes of monitoring for devices (e.g., extensive monitoring, moderate monitoring, minimal monitoring, etc.). Values in monitoring resource availability profile 130 may, in one embodiment, be the difference between values in the device resource profile 122 and values in the device load profile 126. Monitoring resource availability profile 130 may be utilized in subsequent processes identified below for generating the monitoring policy.

Returning to FIG. 1, device 110 may include a device monitoring policy generator 132 configured to generate a device monitoring policy 134. Device monitoring policy generator 132 may be configured according to the process 500 described with respect to FIG. 5.

The process 400 provides an example of a device 110, including a plurality of processors 112 and memories 114, exhibiting excess computational capability beyond a load. This excess computational capability may result in available resources for monitoring of tasks 116, as characterized in the monitoring resource availability profile 130. Conversely, when process 400 determines lacking computational capability based on either insufficient device resources, as evidenced in device resource profile 122, or excessive loading of the device, as evidenced in device load profile 126, then there may be insufficient resources to engage in monitoring of tasks.

Device monitoring by threat monitor 136 may be performed based on the determined schedule or policy. As stated, device 110 may further include monitoring policy generator 132 for generating a specific device monitoring policy 134. Device resource profile generator 120, device load profile generator 124, monitoring resource availability profile generator 128 and monitoring policy generator 132 may be executed at one or more various times such as during configuration of device 110, deployment of device 110, periodically during deployment of device 110, or other times and conditions that may result in the generation of monitoring policy 134.

Further, device resource profile generator 120, device load profile generator 124, monitoring resource availability profile generator 128 and monitoring policy generator 132 may be individually or collectively executed during anticipated load changes which may result in a current or revised device monitoring policy 134. Device monitoring policy generator 132 may execute according to all or portions of the flowchart of FIG. 5 as further described below.

Figure 5:
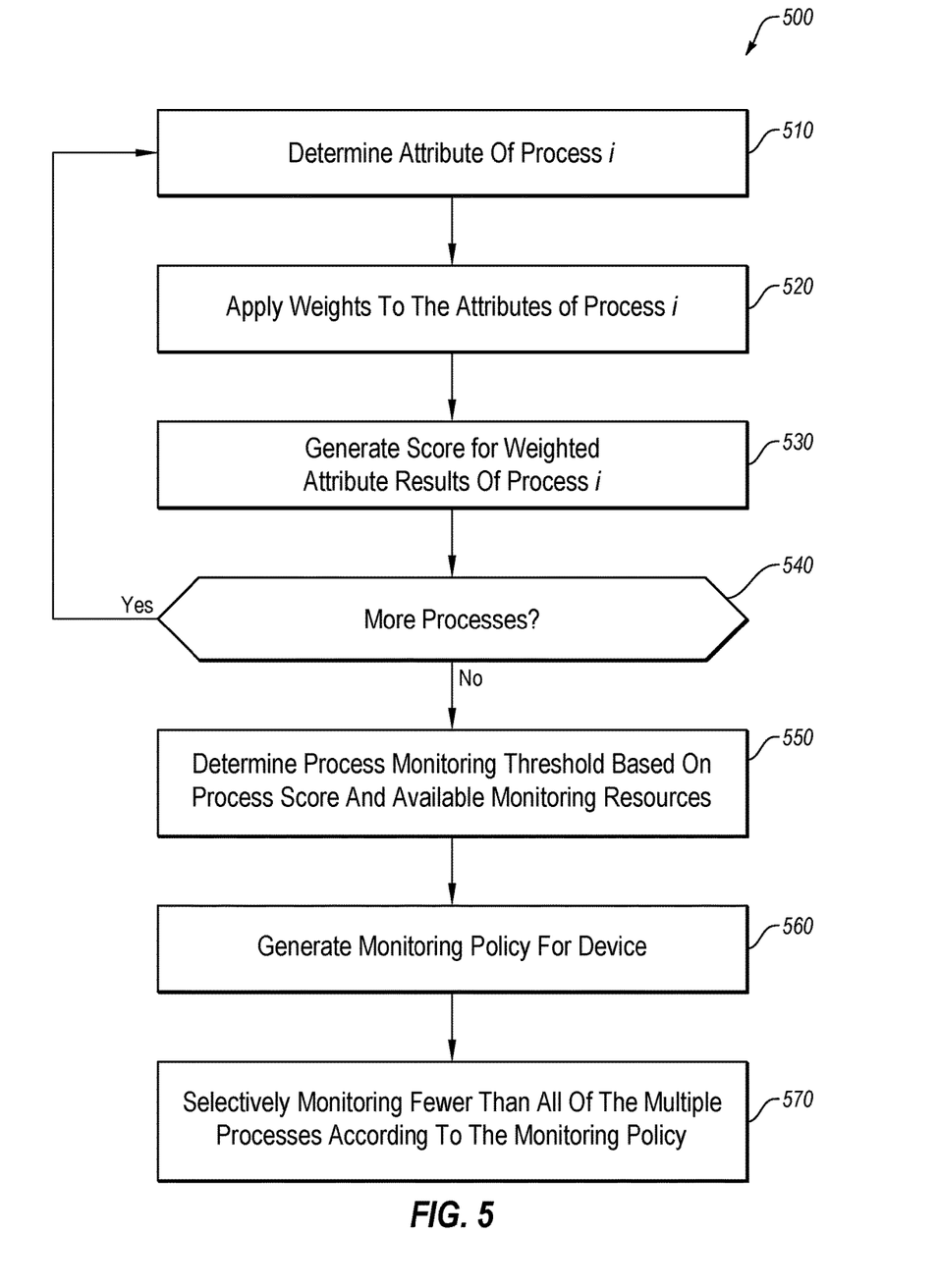
FIG. 5 is a flow diagram illustrating an embodiment for generating a device security monitoring policy.

FIG. 5 is a flow diagram illustrating an embodiment of a process 500 for generating and monitoring a device monitoring policy 134 as illustrated below in FIG. 6. Although illustrated as discrete blocks, various blocks of process 500 may be divided into additional blocks, combined into fewer blocks, or eliminated, depending on the particular implementation.

A block 510 may retrieve attributes $117_iA$-$117_iM$ (FIG. 6) associated with a current task $116_i$. Attributes 117 may be characteristics associated with respective processes 116 and may include a process execution duration, a security context of the process, a level of permissions associated with the process such as administrator or user permissions, presence and/or extent of access to networking resources including identification of ports, identification of servers accessible by the process, etc.

More specifically, attributes may include user permissions such as user, administrator or root permissions, and a state of a task such as an indication of whether the task may be running or sleeping or another indicator of an activity level of the task. Also, attributes may include a hierarchy of the device on which the task may be executing and a quantity of tasks and/or permissions of the respective tasks. Yet further, attributes may include file descriptors designating critical files or tasks and may also include faults such as page faults of varying degrees.

Attributes may also include user mode total time, kernel mode total time and other various priorities, as well as virtual memory sizes. Additionally, attributes may include identities of libraries being used or loaded at the device, a current working set as well as types of outputs (e.g., screen, file, network), and connections to external servers (e.g., bandwidth and criticality of the server). Attributes may also identify the importance of the task and whether the task may be an executable task received from an external interface or from a third party, or if the task handles personally identifiable information (PII).

Some attributes may expose a task to more risk and therefore may be more susceptible to a security threat or breach. For example, a task such as an email task with many interfaces outside of the device may make the task more susceptible to being breached than a task such as a calculator task with no interfaces outside of the device. Accordingly, a task, for example, with many interfaces outside of the device, may be weighted more heavily to signify an increased need to monitor for security threats than a task with few to no interfaces outside the device. The attributes $117_iA$-$117_iM$ may be stored or generated upon execution of process $116_i$.

A block 520 may apply weights $133_i$ to the attributes $117_iA$-$117_iM$ of task $116_i$. As stated, some tasks are more critical than others and some tasks are more vulnerable than others. For example, tasks that handle critical data and servers that receive data may be more heavily weighted then tasks that are simply internal to the device with no external interfaces or exposure. Device monitoring policy 134 may result from the determining, weighting and scoring of various tasks 116A-116P. Weights $133_i$ may prioritize certain security-relevant ones of attributes 117 and minimize less security-relevant other attributes 117 in order to further prioritize certain ones of tasks 116 over other ones of tasks 116. Some attributes 117 may be more or less significant for determining if a specific process should be monitored. Accordingly, device monitoring policy 134 may further include weights 133 that increase or decrease the importance of the various attributes of each task.

Some tasks, such as networking tasks and data exchange tasks such as email or messaging tasks, may have multiple interfaces with points outside of the device. These tasks may be more susceptible to security breaches since they provide avenues of access for a hacker. Accordingly, these tasks may be more heavily weighted to improve the chances of these tasks being monitored for security breaches. Other tasks may be less susceptible to security breaches since they provide few to no avenues of access for malicious attack.

Accordingly, such tasks may be more lightly weighted to reduce the chances of these tasks being monitored for security breaches.

A block 530 may generate a score $606_i$ (FIG. 6) for the process $116_i$ which may be based on the attributes $117_iA$-$117_iM$ as weighted by weights $133_i$ in block 520. As stated, score $606_i$ may be based at least in part on a weighting of attributes $117_iA$-$117_iM$ by weights $133_i$. Attributes and weights may be boolean or have greater granularity. Scoring may include calculating a result from a combination of the attribute and the weight and may further include normalization for use in sorting or otherwise arranging the resulting weighted attributes.

A block 540 may determine if there are additional tasks $116_{i+1}$ to be considered while generating policy 134. Policy 134 may include one or more tasks 116 that may be candidates for monitoring. Tasks 116 may be identified based on user or programmer input, resource calls, or other approaches for initial population. If a further task $116_{i+1}$ is identified, then the process may iteratively return to block 510. In response to no additional tasks $116_{i+1}$ being identified, all of the tasks 116 should have been weighted with a score 606 generated and may be ordered, for example, from highest score 606 to lowest score 606.

A block 550 may determine a task monitoring threshold 608 based at least in part on scores 606. Threshold 608 may be in the range of scores 606 and may designate a value such that tasks 116 with scores 606 greater than threshold 608 may be monitored according to policy 134 and other tasks 116 with scores 606 below threshold 608 may forego monitoring based at least in part on lack of availability of resources (e.g., processors 112, memories 114, capacity on network interface 118, etc.).

Threshold 608 may be determined from the monitoring resource availability profile 130. In one example, the threshold 608 may be determined on a per pool or cluster of servers basis. Threshold 608 may be identified such that tasks 116 with scores above threshold 608 that do not exhaust monitoring resource availability, may be subjected to monitoring while tasks with scores below threshold 608 are not eligible for monitoring. Accordingly, in response to the device load profile 126 indicating a moderate or low load, more monitoring resources may then be available as indicated by the monitoring resource availability profile 130.

Figure 6:
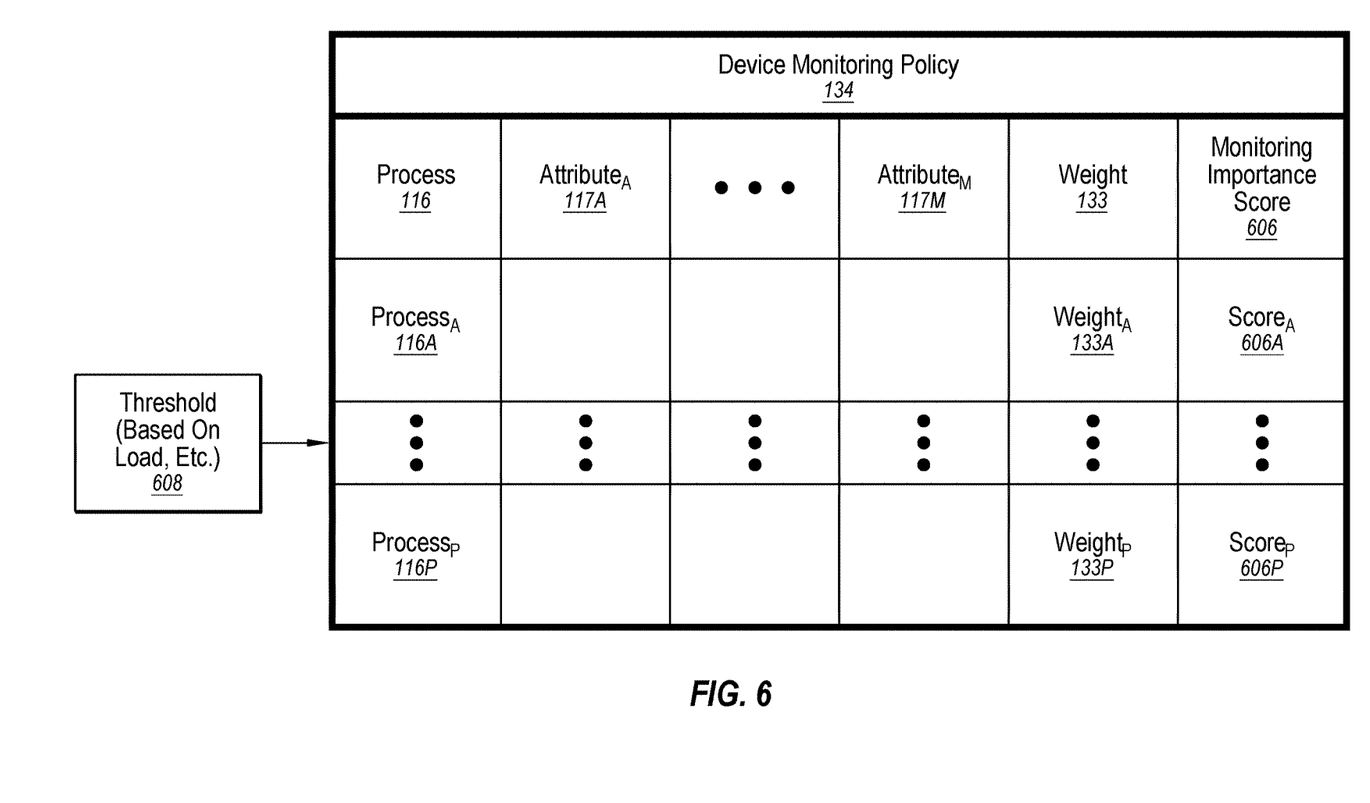
FIG. 6 is a table illustrating an embodiment of a device security monitoring policy.

A block 560 may generate device monitoring policy 134 as illustrated in FIG. 6. For example, as described above, a specific score may be calculated for each or selected ones of tasks executable in the device. The score of each task may be based on a weighting of different attributes (e.g., execution duration, security context, permissions, quantity of input interfaces, quantity of output interfaces). For instance, once one or all of the scores 606A-606P for one or all of tasks 116A-116P have been determined, the scores 606 may be sorted, for example, from highest score to lowest score. By way of example, the weighted tasks with the highest scores may represent the tasks that may be most vulnerable to malicious attack or that would create the most damage in response to a malicious attack.

A threshold may be generated based on the amount of device resources (e.g., processor cycles, available memory, network bandwidth) available for monitoring. A monitoring policy may then be generated based at least in part on the resulting score of the weighted tasks in response to a comparison against the available resources.

A block 570 may selectively monitor fewer than all of the multiple tasks executing on the device for security threats according to the monitoring policy 134. By way of example, tasks 116 having scores 606 greater than the task monitoring threshold 608 may be monitored for one of security breaches, resource unavailability, or error detection.

The process 500 may improve the functioning of a computer itself. By way of example, the functioning of the device 110 itself may be improved by the process 500 at least because the selective monitoring of the tasks 116 at the block 570 of the process 500 may enable the device 110 to avoid security threats even though fewer than all of the tasks 116 executing on the device 110 can be monitored due to a lack of monitoring resources.

Also, the process 500 may improve the technical field of cyber security. By way of example, the technical field of cyber security may be improved by the process 500 at least because prior art processes for security monitoring failed to effectively monitor fewer than all of the processes executing on a device because all processes were treated as having equal levels of risk. In contrast, the process 500 may be employed to enable effective monitoring of and avoidance of security threats by the device 110 because the selective monitoring may be accomplished according to the monitoring policy 134 with higher risk tasks 116 with higher scores 606 being monitored and lower risk tasks 116 with lower scores 606 not being monitored.

FIG. 6 is a table illustrating an embodiment of a device monitoring policy 134. Device monitoring policy 134 may result from the determining, weighting and scoring of various tasks 116A-116P as previously described. While device monitoring policy 134 illustrates a weighting, and scoring of tasks, device monitoring policy 134 may be simplified after generation of the policy to a list of tasks for execution. For thoroughness, the resulting device monitoring policy described in FIG. 6 may include weighting and scoring of tasks.

Policy 134 may include one or more tasks 116 that may be candidates for monitoring. Tasks 116 may be identified based on user or programmer input, resource calls, or other approaches for initial population. As stated, each task 116 may include one or more characteristics or attributes 117, illustrated as attributes 117A-117M. Attributes 117 may include, for example, an execution duration of the task, a security context of the task (e.g., processes confidential information), a level of permissions for the task, a number of transmission ports through the network interface, a number of reception ports through the network interface, a subjective or objective susceptibility to malicious attack, and a criticality for continued execution, among others.

In some embodiments, some attributes 117 may be more or less significant for determining if a specific task should be monitored. Accordingly, device monitoring policy 134 may further include weights 133 that increase or decrease the importance of the various attributes of each task. As stated above, some attributes may expose a task to more risk and therefore may be more susceptible to a security threat or breach. For example, a task such as an email task with many interfaces outside of the device may make the task more susceptible to being breached than a task such as a calculator task with no interfaces outside of the device. Accordingly, a task, for example, with many interfaces outside of the device, may be weighted more heavily to signify an increased need to monitor for security threats than a task with few to no interfaces outside the device. Other attributes may be similarly identified and weighted to better identify tasks with enhanced risks to security breaches. Further, identification of tasks with low risk attributes may be weighted to result in a score 606 below the threshold 608.

Accordingly, monitoring tasks with low risk attributes may needlessly waste monitoring resources of the device.

As stated, some tasks, such as networking task and data exchange tasks such as email or messaging tasks, may have multiple interfaces with points outside of the device. These tasks may be more susceptible to security breaches because they provide avenues of access for a hacker. Accordingly, these tasks may be more heavily weighted to improve the chances of these tasks being monitored for security breaches.

In contrast, other tasks, such as a calculator task or a paint program task may have few to no interfaces with points outside of the device. These other tasks may be less susceptible to security breaches since they provide few to no avenues of access for malicious attack. Accordingly, these other tasks may be more lightly weighted to reduce the chances of these tasks being monitored for security breaches.

Accordingly, weights 133A-133P may be applied to the attributes 117A-117M of the respective tasks 116A-116P. Application of weights 133 to the attributes 117 of each task 116 may result in a score 606A-606P for each task 116A-116P.

Once one or all of the scores 606A-606P for one or all of tasks 116A-116P have been determined, the scores 606 may be sorted, for example, from highest score to lowest score. By way of example, the tasks with the highest scores may represent the tasks that may be most vulnerable to malicious attack or that may create the most damage in response to a malicious attack. Further, the tasks with the highest scores may be the tasks that are more critical to protect from malicious attacks. As stated above, the scoring of the tasks may be represented by weighting of the attributes of the tasks.

Once the tasks 116 have been sorted by score, a determination may be made as to whether all, most, few or none of the tasks 116 may be monitored based on the determined monitoring resource availability profile 130 of device 110. To determine which tasks 116 to monitor, a threshold 608 may be determined based at least in part on the monitoring resource availability profile 130 as determined by the device load profile 126. Threshold 608 may be based a percentage of the monitoring resource availability profile 130 which could allow for less than all of the available resources to be used for monitoring.

A value for threshold 608 may be in the range of scores 606 such that tasks 116 with scores 606 greater than threshold 608 may be monitored according to device monitoring policy 134 and other tasks 116 with scores 606 below threshold 608 may forego monitoring based at least in part on lack of availability of resources (e.g., processors 112, memories 114, capacity on network interface 118, etc.). Stated another way, the monitoring policy may dictate selective monitoring of the multiple tasks executing on the device in response to resources of the device being available for security monitoring are insufficient to monitor all of the tasks executing on the device. Also, if two or more tasks 116 have the same score 606 above the threshold 608, then the tasks 116 with the same score may be alternatively monitored over different time periods.

As noted above, various embodiments of the present disclosure provide for generating a monitoring importance score for multiple tasks executing on a device. Further, availability of monitoring resources for the device may be determined. A monitoring policy may then be generated for the device based at least in part on the monitoring importance scores for the multiple tasks and the monitoring resource availability within the device. The monitoring policy may dictate selective monitoring of the multiple tasks executing on the device in response to resources of the device being available for security monitoring are insufficient to monitor all of the multiple tasks executing on the device. Selective monitoring of fewer than all of the multiple tasks executing on the device for security threats may be performed according to the monitoring policy.

The above described embodiments find application to monitoring for one of security breaches, resource unavailability, or error detection. Security breaches may include malware or other tasks that are malicious in nature resulting in an undesired performance caused by techniques such as viruses, bots, spyware, etc.

Further, the above embodiments also find application to availability monitoring. By generating a device monitoring policy as described herein, a device may also be capable of identifying resource usage and, in the alternative, resource availability. Identification of resource availability enables a device to engage in more or fewer tasks depending upon an acceptable loading of the device. Also, identification of resource availability when compared to a baseline, may also be indicative of malware or resource malfunction.

Yet further, the above embodiments also find application to error detection monitoring. By generating a monitoring policy as described herein, a device may also be capable of identifying errors both in software and hardware. Errors in software and hardware may be manifested by a discrepancy in the resource availability when compared with a baseline of the resource availability. Errors in software may be a result of software that has been intentionally or unintentionally corrupted and therefore uses more or fewer resources when compared with a baseline. Further, errors in software may be a result of programming errors that result in unanticipated performance. Errors in hardware may be the result of hardware failures or hijacked hardware resources when compared with a baseline.

As indicated above, the embodiments described herein may include the use of a special purpose or general purpose computer (e.g., processors) including various computer hardware or software modules, as discussed. Further, as indicated above, embodiments described herein may be implemented using computer-readable medium (e.g., memory) for having computer-executable instructions or data structures stored thereon.

Some common forms of computer readable medium include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may be adapted to read.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even in response to the same claim including the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even in response to the same claim including the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles identified herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   determining a plurality of security attributes for each respective task of multiple tasks executing on a device, the plurality of security attributes including an execution duration of the respective task, a security context of the respective task, a permission level for accessing the respective task, and a quantity of interfaces external to the device that interface with the respective task;
   generating a security monitoring importance score for each respective task of the multiple tasks based on the plurality of security attributes that correspond to the respective task in which each security monitoring importance score indicates a security risk of the respective task to the device;
   determining an availability of a plurality of monitoring resources within the device that are used in monitoring the multiple tasks for security threats;
   generating a monitoring policy for the device based at least in part on the security monitoring importance scores for the multiple tasks and the availability of monitoring resources within the device, the monitoring policy dictating selective monitoring of the multiple tasks for security threats according to a prioritization of the multiple tasks that is based on the respective security monitoring importance scores for the respective tasks of the multiple tasks in which the monitoring policy dictates the selective monitoring in response to the availability of monitoring resources of the device being insufficient to monitor all of the multiple tasks executing on the device; and selectively monitoring fewer than all of the multiple tasks executing on the device for security threats according to the prioritization included in the monitoring policy.

2. The method of claim 1, wherein the generating the security monitoring importance score for each respective task further comprises applying weights to the plurality of attributes.

3. The method of claim 1, wherein determining the availability of monitoring resources within the device further comprises determining a quantity of resources of the device.

4. The method of claim 1, wherein determining the availability of monitoring resources within the device further comprises analyzing an average load of the resources of the device over a period of time.

5. The method of claim 1, wherein the generating the monitoring policy for the device further comprises determining a monitoring threshold for selective monitoring of fewer than all of the multiple tasks in which the monitoring threshold includes a threshold security monitoring importance score.

6. A device, comprising:
one or more processors; and
one or more non-transitory computer-readable media coupled to the one or more processors and including instructions that, in response to execution by the one or more processors, are configured to cause the one or more processors to perform operations, the operations comprising:
determining one or more security attributes for each respective task of multiple tasks executing on a device, the one or more security attributes including one or more attributes selected from a group of attributes consisting of: an execution duration of the respective task, a security context of the respective task, a permission level for accessing the respective task, and a quantity of interfaces external to the device that interface with the respective task
generating a security monitoring importance score for each respective task of the multiple tasks based on the one or more security attributes that correspond to the respective task in which each security monitoring importance score indicates a security risk of the respective task to the device;
determining an availability of a plurality of monitoring resources within the device that are used in monitoring the multiple tasks for security threats;
generating a monitoring policy for the device based at least in part on the security monitoring importance scores for the multiple tasks and the availability of monitoring resources within the device, the monitoring policy dictating selective monitoring of the multiple tasks for security threats according to a prioritization of the multiple tasks that is based on the respective security monitoring importance scores for the respective tasks of the multiple tasks in which the monitoring policy dictates the selective monitoring in response to the availability of monitoring resources of the device being insufficient to monitor all of the multiple tasks executing on the device; and
selectively monitoring fewer than all of the multiple tasks executing on the device for security threats according to the prioritization included in the monitoring policy.

7. The device of claim 6, wherein the generating the security monitoring importance score for each respective task further comprises applying weights to the one or more.

8. The device of claim 6, wherein determining the availability of monitoring resources within the device further comprises determining a quantity of resources of the device.

9. The device of claim 6, wherein determining the availability of monitoring resources within the device further comprises analyzing an average load of the resources of the device over a period of time.

10. The device of claim 6, wherein the generating the monitoring policy for the device further comprises determining a monitoring threshold for selective monitoring of fewer than all of the multiple tasks in which the monitoring threshold includes a threshold security monitoring importance score.

11. A non-transitory computer-readable medium that includes instructions that, in response to execution by one or more processors, are configured to cause the one or more processors to perform operations, the operations comprising:
generating a monitoring importance score for each respective task of multiple tasks executing on a device based on one or more security attributes that correspond to the respective task in which each security monitoring importance score indicates a security risk of the respective task to the device;
determining an availability of a plurality of monitoring resources within the device that are used in monitoring the multiple tasks for security threats;
generating a monitoring policy for the device based at least in part on the security monitoring importance scores for the multiple tasks and the availability of monitoring resources within the device, the monitoring policy dictating selective monitoring of the multiple tasks for security threats according to a prioritization of the multiple tasks that is based on the respective security monitoring importance scores for the respective tasks of the multiple tasks in which the monitoring policy dictates the selective monitoring in response to the availability of monitoring resources of the device being insufficient to monitor all of the multiple tasks executing on the device; and
selectively monitoring fewer than all of the multiple tasks executing on the device for security threats according to the prioritization included in the monitoring policy.

12. The non-transitory computer-readable medium of claim 11, wherein the one or more security attributes include one or more attributes selected from a group of attributes consisting of: an execution duration of each of the multiple tasks, a security context of each of the multiple tasks, a level of permissions for a user of each of the multiple tasks, and a quantity of external interfaces to each of the multiple tasks.

13. The non-transitory computer-readable medium of claim 11, wherein the generating the security monitoring importance score for each respective task further comprises applying weights to the one or more attributes to generate the security monitoring importance score.

14. The non-transitory computer-readable medium of claim 11, wherein determining the availability of monitoring resources within the device further comprises analyzing an average load of the resources of the device over a period of time.

15. The non-transitory computer-readable medium of claim 11, wherein the generating the monitoring policy for the device further comprises determining a monitoring threshold for selective monitoring fewer than all of the multiple tasks in which the monitoring threshold includes a threshold security monitoring importance score.

* * * * *